United States Patent
Lyu et al.

(10) Patent No.: US 12,266,192 B2
(45) Date of Patent: Apr. 1, 2025

(54) TRAFFIC LIGHT DETECTION AND CLASSIFICATION FOR AUTONOMOUS DRIVING VEHICLES

(71) Applicants: Baidu USA LLC, Sunnyvale, CA (US); Baidu.com Times Technology (Beijing) Co., Ltd., Beijing (CN)

(72) Inventors: Jeong Ho Lyu, Sunnyvale, CA (US); Lingchang Li, Beijing (CN)

(73) Assignees: Baidu USA LLC, Sunnyvale, CA (US); Baidu.com Times Technology (Beijing) Co., Ltd., Beijing (CN)

( * ) Notice: Subject to any disclaimer, the term of this patent is extended or adjusted under 35 U.S.C. 154(b) by 0 days.

(21) Appl. No.: 17/294,877

(22) PCT Filed: Apr. 20, 2021

(86) PCT No.: PCT/CN2021/088379
§ 371 (c)(1),
(2) Date: May 18, 2021

(87) PCT Pub. No.: WO2022/222028
PCT Pub. Date: Oct. 27, 2022

(65) Prior Publication Data
US 2024/0020988 A1 Jan. 18, 2024

(51) Int. Cl.
*G06V 20/58* (2022.01)
*B60W 60/00* (2020.01)
(Continued)

(52) U.S. Cl.
CPC ......... *G06V 20/584* (2022.01); *B60W 60/001* (2020.02); *G06V 10/56* (2022.01);
(Continued)

(58) Field of Classification Search
CPC ... G06V 20/584; G06V 10/56; B60W 60/001; B60W 2420/42; B60W 2555/60; H04N 23/73
See application file for complete search history.

(56) References Cited

U.S. PATENT DOCUMENTS 6,784,939 B1    8/2004  Lee et al.
7,053,954 B1 *  5/2006  Canini ................... H04N 23/73
                                                        348/E5.037
(Continued)

FOREIGN PATENT DOCUMENTS

CN    104838644 A    8/2015
CN    105083122 A    11/2015
(Continued)

*Primary Examiner* — Isaac G Smith
*Assistant Examiner* — Nikki Marie M Molina
(74) *Attorney, Agent, or Firm* — WOMBLE BOND DICKINSON (US) LLP (57) ABSTRACT

A driving environment is perceived based on sensor data obtained from a plurality of sensors mounted on the ADV, including detecting a traffic light, where the plurality of sensors includes at least one image sensor. A first sensor setting is applied to the at least one image sensor to capture a first frame, and a second sensor setting is applied to the at least one image sensor to capture a second frame. A color of the traffic light is determined based on sensor data of the at least one image sensor in the first frame. The ADV is controlled to drive autonomously according to the color of the traffic light determined based on sensor data of the at least one image sensor in the first frame and a driving environment perceived based on sensor data of the at least one image sensor in the second frame.

21 Claims, 9 Drawing Sheets

(51) Int. Cl.
*G06V 10/56* (2022.01)
*H04N 23/73* (2023.01)

(52) U.S. Cl.
CPC ....... *H04N 23/73* (2023.01); *B60W 2420/403* (2013.01); *B60W 2555/60* (2020.02)

(56) References Cited

U.S. PATENT DOCUMENTS

| | | | |
|---|---|---|---|
| 9,654,738 B1 | 5/2017 | Ferguson et al. | |
| 2010/0172542 A1 | 7/2010 | Stein et al. | |
| 2016/0318490 A1* | 11/2016 | Ben Shalom | ... B60W 30/18109 |
| 2018/0278824 A1 | 9/2018 | Somasundaram et al. | |
| 2019/0208111 A1* | 7/2019 | Wendel | ................. H04N 23/45 |
| 2019/0243376 A1* | 8/2019 | Davis | ...................... G06T 7/292 |
| 2021/0084210 A1 | 3/2021 | Breuer et al. | |
| 2021/0211568 A1* | 7/2021 | Zhou | .................. G08G 1/09623 |
| 2022/0006939 A1* | 1/2022 | Lee | ........................ H04N 23/73 |

FOREIGN PATENT DOCUMENTS

| | | |
|---|---|---|
| CN | 105635597 A | 6/2016 |
| CN | 110678374 A | 1/2020 |
| CN | 111670419 A | 9/2020 |
| JP | 2019175051 A | 10/2019 |
| JP | 2021088289 A | 6/2021 |
| WO | 2020096192 A1 | 5/2020 |
| WO | 2020116205 A1 | 6/2020 |

\* cited by examiner

TRAFFIC LIGHT DETECTION AND CLASSIFICATION FOR AUTONOMOUS DRIVING VEHICLES

CROSS-REFERENCE TO RELATED APPLICATION

This patent application is a U.S. National Phase Application under 35 U.S.C. § 371 of International Application No. PCT/CN2021/088379, filed Apr. 20, 2021, entitled "TRAFFIC LIGHT DETECTION AND CLASSIFICATION FOR AUTONOMOUS DRIVING VEHICLES," which is incorporated by reference herein in its entirety.

TECHNICAL FIELD

Embodiments of the present disclosure relate generally to operating autonomous driving vehicles (ADVs). More particularly, embodiments of the disclosure relate to traffic light detection and classification of an ADV.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. Traffic light detection and classification is important for motion planning and control of an ADV. However, it is difficult to recognize red traffic light signal, for example, under dark/cloudy environment, due to the color artifact. A lot of cases of failure to recognize red traffic light signals have been reported.

SUMMARY

Embodiments of the present disclosure provide a computer-implemented method for operating an autonomous driving vehicle (ADV), a non-transitory machine-readable medium, a data processing system, and a computer program product.

In a first aspect, some embodiments of the present disclosure provide a computer-implemented method for operating an autonomous driving vehicle (ADV). The method includes: perceiving a driving environment based on sensor data obtained from a plurality of sensors mounted on the ADV, including detecting a traffic light, the plurality of sensors including at least one image sensor; applying a first sensor setting to the at least one image sensor to capture a first frame; applying a second sensor setting to the at least one image sensor to capture a second frame; determining a color of the traffic light based on sensor data of the at least one image sensor in the first frame; and controlling the ADV to drive autonomously according to the color of the traffic light determined based on sensor data of the at least one image sensor in the first frame and a driving environment perceived based on sensor data of the at least one image sensor in the second frame.

In a second aspect, some embodiments of the present disclose-disclosure provide a non-transitory machine-readable medium having instructions stored therein, which when executed by a processor, cause the processor to perform operations, the operations include: perceiving a driving environment based on sensor data obtained from a plurality of sensors mounted on the ADV, including detecting a traffic light, the plurality of sensors including at least one image sensor; applying a first sensor setting to the at least one image sensor to capture a first frame; applying a second sensor setting to the at least one image sensor to capture a second frame; determining a color of the traffic light based on sensor data of the at least one image sensor in the first frame; and controlling the ADV to drive autonomously according to the color of the traffic light determined based on sensor data of the at least one image sensor in the first frame and a driving environment perceived based on sensor data of the at least one image sensor in the second frame.

In a third aspect, some embodiments of the present disclosure provide a data processing system, the data processing system includes: a processor; and a memory coupled to the processor to store instructions, which when executed by the processor, cause the processor to perform operations, the operations includes: perceiving a driving environment based on sensor data obtained from a plurality of sensors mounted on the ADV, including detecting a traffic light, the plurality of sensors including at least one image sensor; applying a first sensor setting to the at least one image sensor to capture a first frame; applying a second sensor setting to the at least one image sensor to capture a second frame; determining a color of the traffic light based on sensor data of the at least one image sensor in the first frame; and controlling the ADV to drive autonomously according to the color of the traffic light determined based on sensor data of the at least one image sensor in the first frame and a driving environment perceived based on sensor data of the at least one image sensor in the second frame.

In a fourth aspect, some embodiments of the present disclosure provide a computer program product, the computer program product includes a computer program, the computer program, when executed by a processor, causes the processor to implement the method according to the first aspect.

BRIEF DESCRIPTION OF THE DRAWINGS

Embodiments of the disclosure are illustrated by way of example and are not limitations in the figures of the accompanying drawings in which like references indicate similar elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, upon detecting a traffic light, an exposure time of a sensor of an ADV is reduced, for example, to a minimum exposure time or an exposure time similar to the condition of bright light or day light. All the gain(s) of the sensor may be set to x1. The shorter exposure time or lower gain(s) may be applied to a sensor setting of the sensor in alternative frames. For example, one frame (Frame B) may be a normal condition. The other frame (Frame A) may be a short exposure condition (e.g., shorter exposure time or lower gain(s)). For example, a bounding box may be defined around a traffic light. Statistics (Mean or min/max or percentile etc.) of red, green, and/or blue color light may be extracted. A short exposure time/Gain may be applied to meet the threshold of the statistics of red, green, and/or blue color light, and may be applied on one frame (Frame A). Thus, Frame A may be used to recognize the condition of the traffic light. Frame B may be used to perceive a driving environment. The ADV may be controlled to drive autonomously according to both the condition of traffic light recognized using Frame A and the driving environment perceived using Frame A.

According to some embodiments, a driving environment is perceived based on sensor data obtained from a plurality of sensors mounted on the ADV, including detecting a traffic light, where the plurality of sensors includes at least one image sensor. A first sensor setting is applied to the at least one image sensor to capture a first frame, and a second sensor setting is applied to the at least one image sensor to capture a second frame. A color of the traffic light is determined based on sensor data of the at least one image sensor in the first frame. The ADV is controlled to drive autonomously according to the color of the traffic light determined based on sensor data of the at least one image sensor in the first frame and a driving environment perceived based on sensor data of the at least one image sensor in the second frame. In this way, the ADV may recognize the red color of the traffic light signal and perceive the driving environment under dark/cloudy environment, thereby increasing the driving safety.

In one embodiment, the first sensor setting includes at least one of a first exposure time or a first gain, the second sensor setting includes at least one of a second exposure time or a second gain, and the at least one of the first exposure time or the first gain is less than the at least one of the second exposure time or the second gain respectively.

In one embodiment, the first sensor setting is determined based on a minimum value or a predetermined value under a day light condition. In one embodiment, a bounding box is determined around the traffic light in the sensor data of the at least one image sensor in the first frame, and a feature of pixels within the bounding box is extracted.

In one embodiment, the feature of the pixels within the bounding box includes at least one of a mean value, a minimum value, a maximum value, or a percentile of one of red color, green color, or blue color of the pixels within the bounding box. In one embodiment, the first sensor setting is determined based on a predetermined threshold of the feature of the pixels within the bounding box.

In one embodiment, an initial exposure time is determined in an initial setting of the at least one image sensor upon detecting the traffic light, and whether the initial exposure time of the at least one image sensor exceeds a predetermined threshold is determined. The first sensor setting is applied to the at least one image sensor in response to determining that the initial setting of the at least one image sensor exceeds the predetermined threshold.

Figure 1:
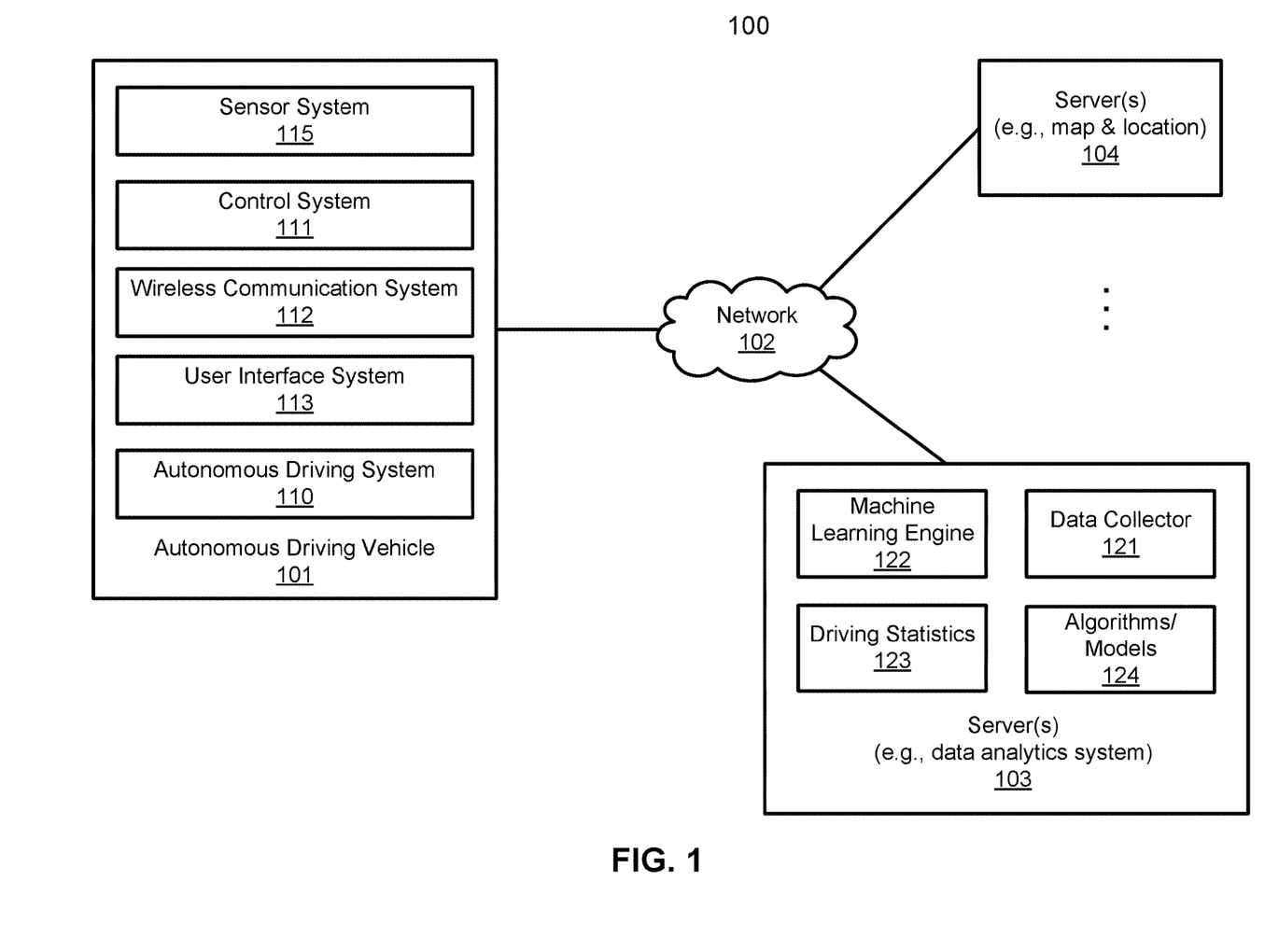
FIG. 1 is a block diagram illustrating a networked system according to one embodiment.

FIG. 1 is a block diagram illustrating an autonomous driving network configuration according to one embodiment of the disclosure. Referring to FIG. 1, network configuration 100 includes autonomous driving vehicle (ADV) 101 that may be communicatively coupled to one or more servers 103-104 over a network 102. Although there is one ADV shown, multiple ADVs can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An ADV refers to a vehicle that can be configured to in an autonomous mode in which the vehicle navigates through an environment with little or no input from a driver. Such an ADV can include a sensor system having one or more sensors that are configured to detect information about the environment in which the vehicle operates. For example, the ADV may include one or more image sensors to perceive a driving environment surrounding the ADV. The vehicle and its associated controller(s) use the detected information to navigate through the environment. ADV 101 can operate in a manual mode, a full autonomous mode, or a partial autonomous mode.

In one embodiment, ADV 101 includes, but is not limited to, autonomous driving system (ADS) 110, vehicle control system 111, wireless communication system 112, user interface system 113, and sensor system 115. ADV 101 may further include certain common components included in ordinary vehicles, such as, an engine, wheels, steering wheel, transmission, etc., which may be controlled by vehicle control system 111 and/or ADS 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
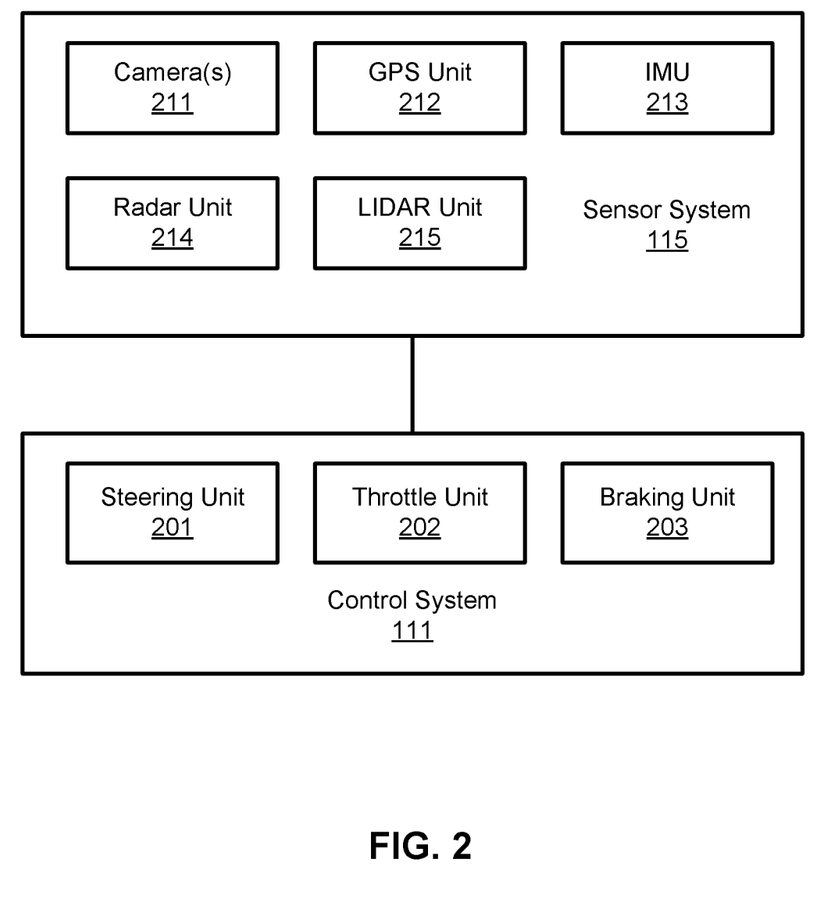
FIG. 2 is a block diagram illustrating an example of an autonomous driving vehicle according to one embodiment.

Referring now to FIG. 2, in one embodiment, sensor system 115 includes, but it is not limited to, one or more cameras 211 (including one or more image sensors), global positioning system (GPS) unit 212, inertial measurement unit (IMU) 213, radar unit 214, and a light detection and range (LIDAR) unit 215. GPS system 212 may include a transceiver operable to provide information regarding the position of the ADV. IMU unit 213 may sense position and orientation changes of the ADV based on inertial acceleration. Radar unit 214 may represent a system that utilizes radio signals to sense objects within the local environment of the ADV. In some embodiments, in addition to sensing objects, radar unit 214 may additionally sense the speed and/or heading of the objects. LIDAR unit 215 may sense objects in the environment in which the ADV is located using lasers. LIDAR unit 215 could include one or more laser sources, a laser scanner, and one or more detectors, among other system components. Cameras 211 may include one or more devices to capture images of the environment surrounding the ADV. For example, cameras 211 may include one or more image sensors to capture images of the driving environment surrounding the ADV. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the ADV. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between ADV 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101, for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of ADV 101 may be controlled or managed by ADS 110, especially when operating in an autonomous driving mode. ADS 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, ADS 110 may be integrated with vehicle control system 111.

For example, a user as a passenger may specify a starting location and a destination of a trip, for example, via a user interface. ADS 110 obtains the trip related data. For example, ADS 110 may obtain location and route data from an MPOI server, which may be a part of servers 103-104. The location server provides location services and the MPOI server provides map services and the POIs of certain locations. Alternatively, such location and MPOI information may be cached locally in a persistent storage device of ADS 110.

While ADV 101 is moving along the route, ADS 110 may also obtain real-time traffic information from a traffic information system or server (TIS). Note that servers 103-104 may be operated by a third-party entity. Alternatively, the functionalities of servers 103-104 may be integrated with ADS 110. Based on the real-time traffic information, MPOI information, and location information, as well as real-time local environment data detected or sensed by sensor system 115 (e.g., obstacles, objects, nearby vehicles), ADS 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either ADVs or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms 124 may include an algorithm or model to perceive a driving environment based on sensor data obtained from a plurality of sensors mounted on the ADV, including detecting a traffic light, where the plurality of sensors include at least one image sensor. Algorithms 124 may further include an algorithm or model to apply a first sensor setting to the at least one image sensor to capture a first frame, an algorithm or model to apply a second sensor setting to the at least one image sensor to capture a second frame, an algorithm or model to determine a condition of the traffic light based on sensor data of the at least one image sensor in the first frame, and/or an algorithm or model to control the ADV to drive autonomously according to the condition of the traffic light determined based on sensor data of the at least one image sensor in the first frame and a driving environment perceived based on sensor data of the at least one image sensor in the second frame. Algorithms 124 can then be uploaded on ADVs to be utilized during autonomous driving in real-time.

Figure 3A:
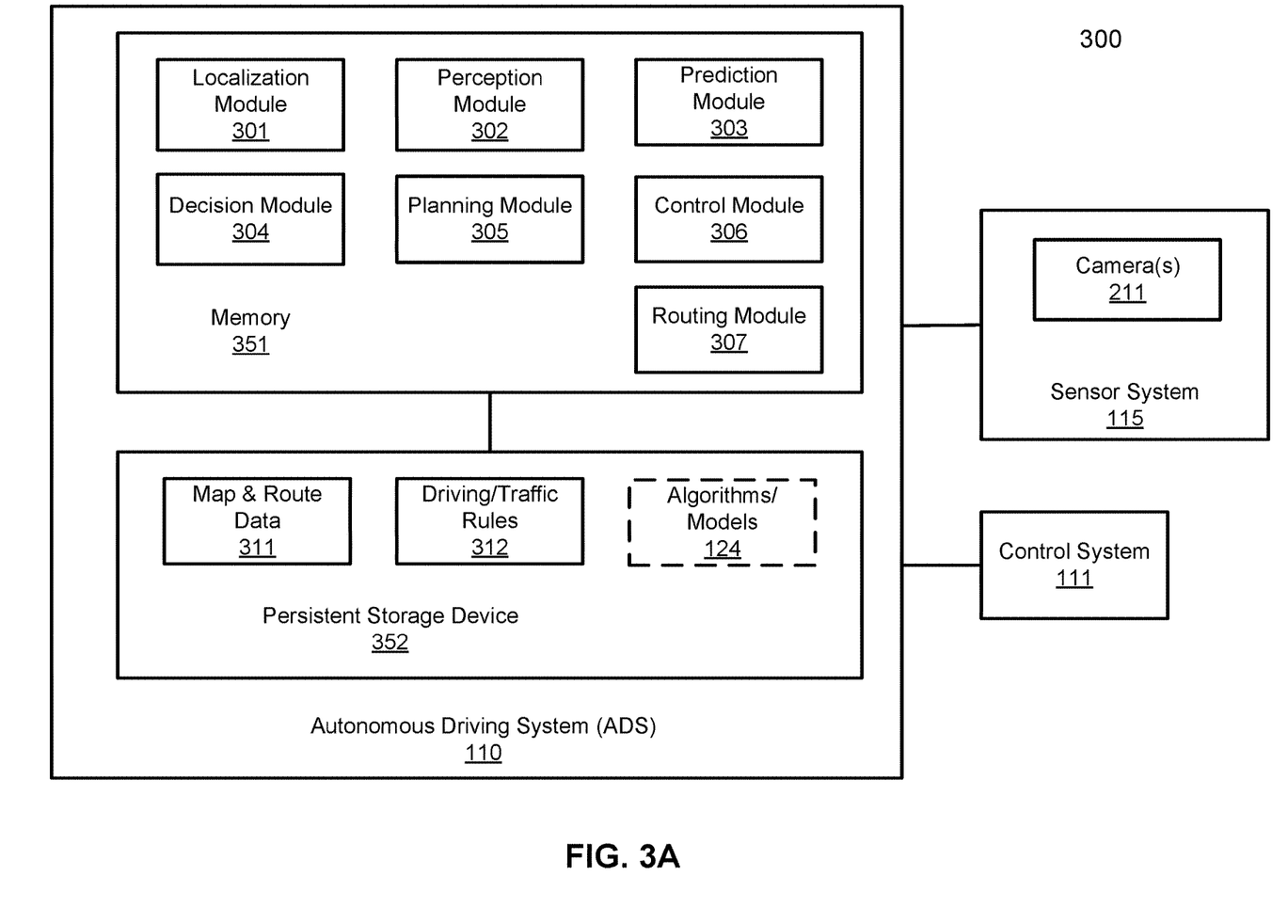
FIGS. 3A-3B are block diagrams illustrating an example of an autonomous driving system used with an autonomous driving vehicle according to one embodiment.
Figure 3B:
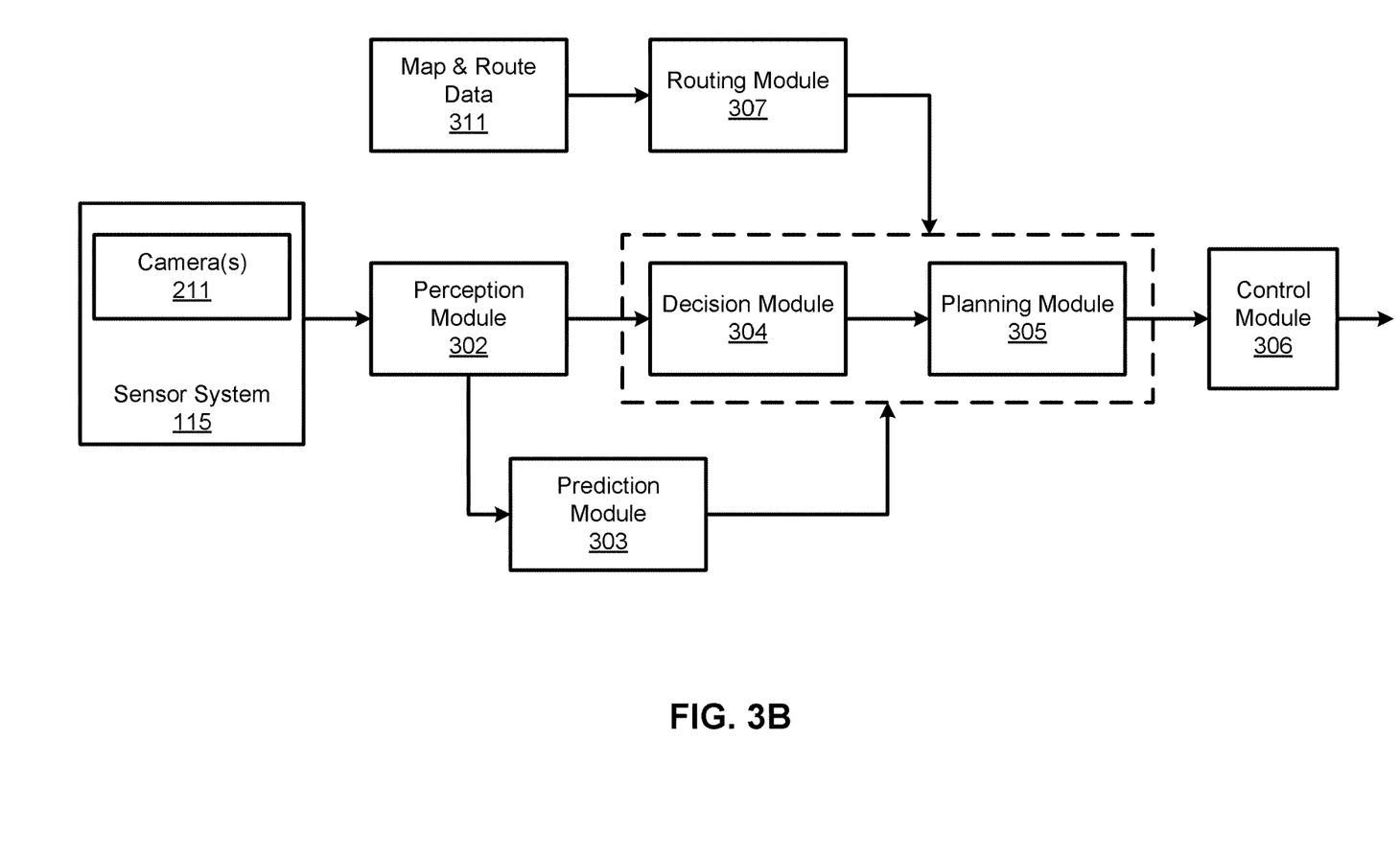

FIGS. 3A and 3B are block diagrams illustrating an example of an autonomous driving system used with an ADV according to one embodiment. System 300 may be implemented as a part of ADV 101 of FIG. 1 including, but is not limited to, ADS 110, control system 111, and sensor system 115. Referring to FIGS. 3A-3B, ADS 110 includes, but is not limited to, localization module 301, perception module 302, prediction module 303, decision module 304, planning module 305, control module 306, routing module 307.

Some or all of modules 301-307 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module.

Localization module 301 determines a current location of ADV 101 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of ADV 101, such as map and route data 311, to obtain the trip related data. For example, localization module 301 may obtain location and route data from a location server and a map and POI (MPOI) server. A location server provides location services and an MPOI server provides map services and the POIs of certain locations, which may be cached as part of map and route data 311. While ADV 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of the ADV. The objects can include traffic signals, road-way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what how the object will behave under the circumstances. The prediction is performed based on the perception data perceiving the driving environment at the point in time in view of a set of map/route information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left- or right-turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is are no other vehicles, pedestrians, or obstacles on the road, an ADV should exactly or closely follow the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the ADV, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 miles per hour (mph), then change to a right lane at the speed of 25 mph.

Based on the planning and control data, control module 306 controls and drives the ADV, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the ADV. For example, the navigation system may determine a series of speeds and directional headings to affect movement of the ADV along a path that substantially avoids perceived obstacles while generally advancing the ADV along a roadway-based path leading to an ultimate destination. The destination may be set according to user inputs via user interface system 113. The navigation system may update the driving path dynamically while the ADV is in operation. The navigation system can incorporate data from a GPS system and one or more maps so as to determine the driving path for the ADV.

Figure 4:
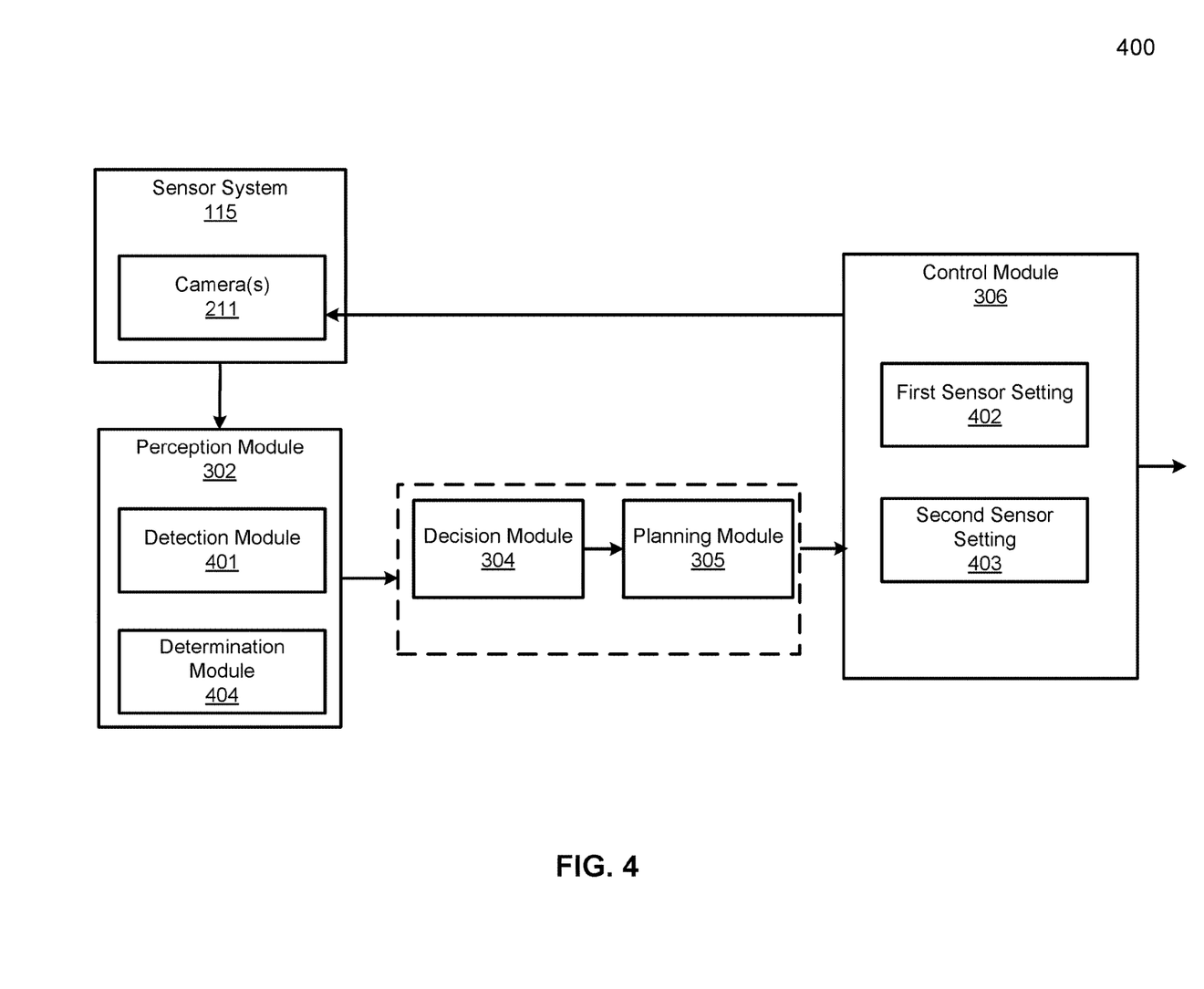
FIG. 4 is a block diagram illustrating an example of a control module of an autonomous driving system of an autonomous driving vehicle according to one embodiment.

FIG. 4 is a block diagram 400 illustrating an example of a perception module and a control module of an autonomous driving system of an autonomous driving vehicle according to one embodiment. Referring to FIG. 4, perception module 302 includes, but is not limited to, detection module 401 and determination module 404. Perception module 302 is configured to perceive a driving environment based on sensor data obtained from a plurality of sensors mounted on the ADV, where the plurality of sensors includes at least one image sensor. Detection module 401 is configured to detect a traffic light. Control module 306 includes, but is not limited to, a first sensor setting module 402 and a second sensor setting module 403. First sensor setting module 402 is configured to apply a first sensor setting to the at least one image sensor to capture a first frame, and second sensor setting module 403 is configured to apply a second sensor setting to the at least one image sensor to capture a second frame. Determination module 404 is configured to determine a condition of the traffic light based on sensor data of the at least one image sensor in the first frame. Detection module 401 is further configured to detect a driving environment based on sensor data of the at least one image sensor in the second frame. Control module 306 is further configured to control the ADV to drive autonomously according to the condition of the traffic light determined based on sensor data of the at least one image sensor in the first frame and a driving environment detected based on sensor data of the at least one image sensor in the second frame. For example, control module 306 may be further configured to control a brake of the ADV autonomously according to the condition of the traffic light determined based on sensor data of the at least one image sensor in the first frame, and control module 306 may be further configured to control a wheel of the ADV autonomously according to the driving environment detected based on sensor data of the at least one image sensor in the second frame.

Figure 5:
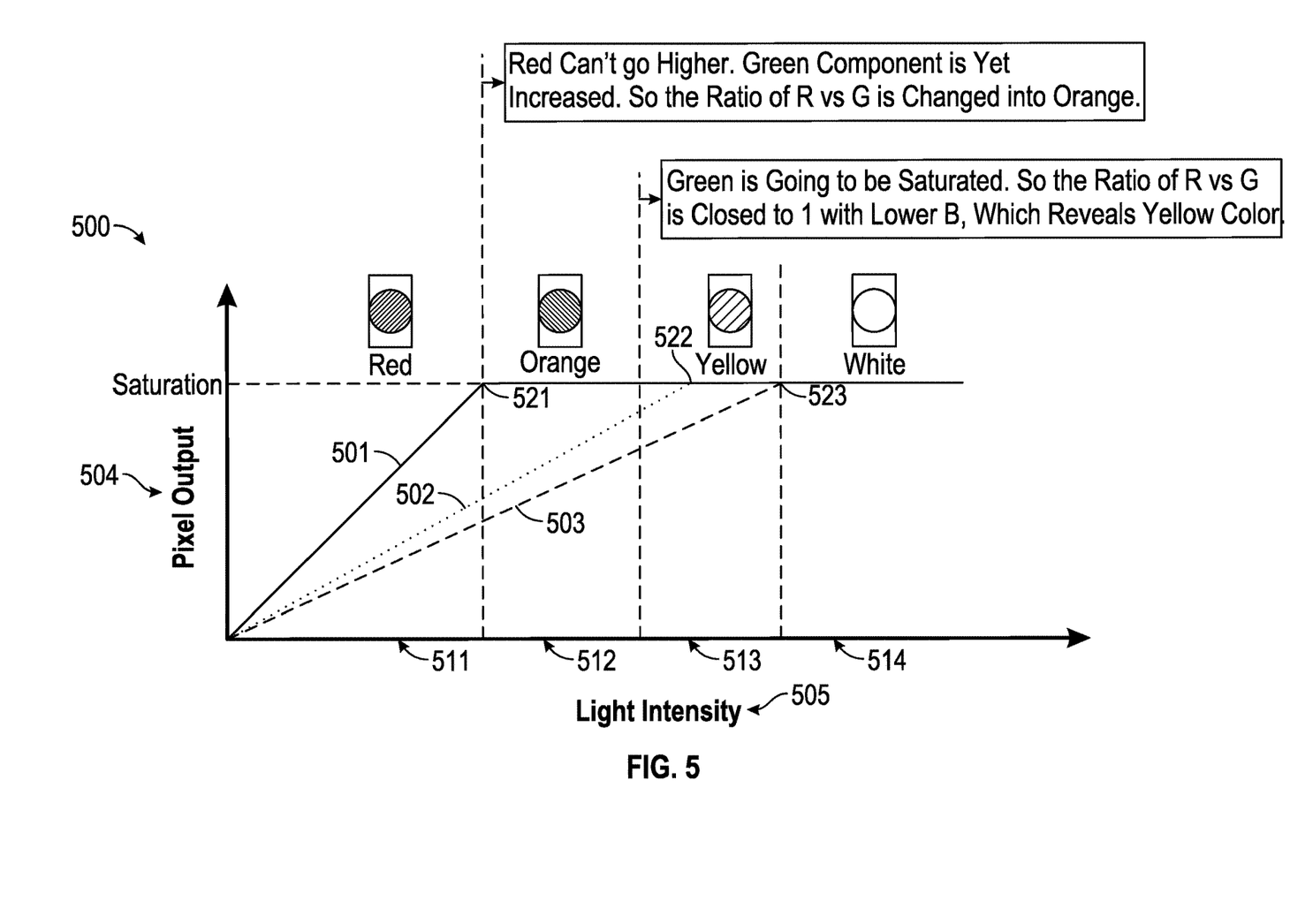
FIG. 5 illustrates an example of a pixel output versus a light intensity of a sensor of an autonomous driving system of an autonomous driving vehicle according to one embodiment.

FIG. 5 is a diagram 500 illustrating an example of a pixel output 504 versus a light intensity 505 of an image sensor of an autonomous driving system of an autonomous driving vehicle according to one embodiment. It is important to successfully detect a traffic light and correctly classify the traffic light (e.g., red, yellow, or green traffic light signal) for motion planning and control of an ADV. However, it is difficult to correctly recognize a red traffic light signal, especially under dark/cloudy environment. A lot of cases of failure to recognize red traffic light signals have been reported due to a color artifact. For example, an ADV may fail to recognize a red traffic light signal by missing the red traffic light signal. For another example, an ADV may mistakenly determine a red traffic light signal as a yellow traffic light signal. The failure to recognize red traffic light signals may be due to a color artifact of the image sensor(s) of the camera(s) of the ADV.

The image sensor pixel output 504 includes red-light component (R component) 501, green-light component (G component) 502, and blue-light component (B component) 503. For example, the image sensor(s) of the camera(s) of the ADV may use a Bayer filter, which is a color filter array (CFA) for arranging RGB color filters on a square grid of photosensors. The Bayer filter's particular arrangement of color filters is used in most single-chip digital image sensors in digital cameras, camcorders, and scanners to create a color image.

Under dark/cloudy environment, the exposure time of the image sensor in a typical sensor setting is increased. Then red-light intensity (R component) 501 is increased according to the exposure time, as well as the green-light intensity (G component) 502 and blue-light intensity (B component) 503. However, the red-light intensity (R component) has a red-light intensity saturation threshold 521, which is lower than a green-light intensity saturation threshold 522 or a blue-light intensity saturation threshold 523.

In zone 511, the red-light intensity (R component) 501, the green-light intensity (G component) 502 and blue-light intensity (B component) 503 are increased and the three component are in a proper ratio. Thus, the pixel output 504 is in a red color.

In zone 512, when the red-light intensity (R component) 501 is increased to the red-light intensity saturation threshold 521, the red-light intensity (R component) 501 is saturated and can't go higher. The green-light intensity (G component) 502 is still increased. So the ratio of R component versus G component is changed, thus, the pixel output 504 is changed into an orange color in zone 512.

In zone 513, when the green-light intensity (G component) 502 is going to reach the green-light intensity saturation threshold 522, the green-light intensity (G component) 502 is going to be saturated. So the ratio of R component 501 versus G component 502 is close to 1 with a lower B component 503. Thus, the pixel output 504 reveals a yellow color.

In zone 514, when all three components are saturated, the pixel output 504 reveals a white color.

As illustrated in FIG. 5, under dark/cloudy environment, the increased exposure time of the image sensor in a typical sensor setting may cause an artifact, which may result in the failure to recognize the red traffic light signal.

Figure 6A:
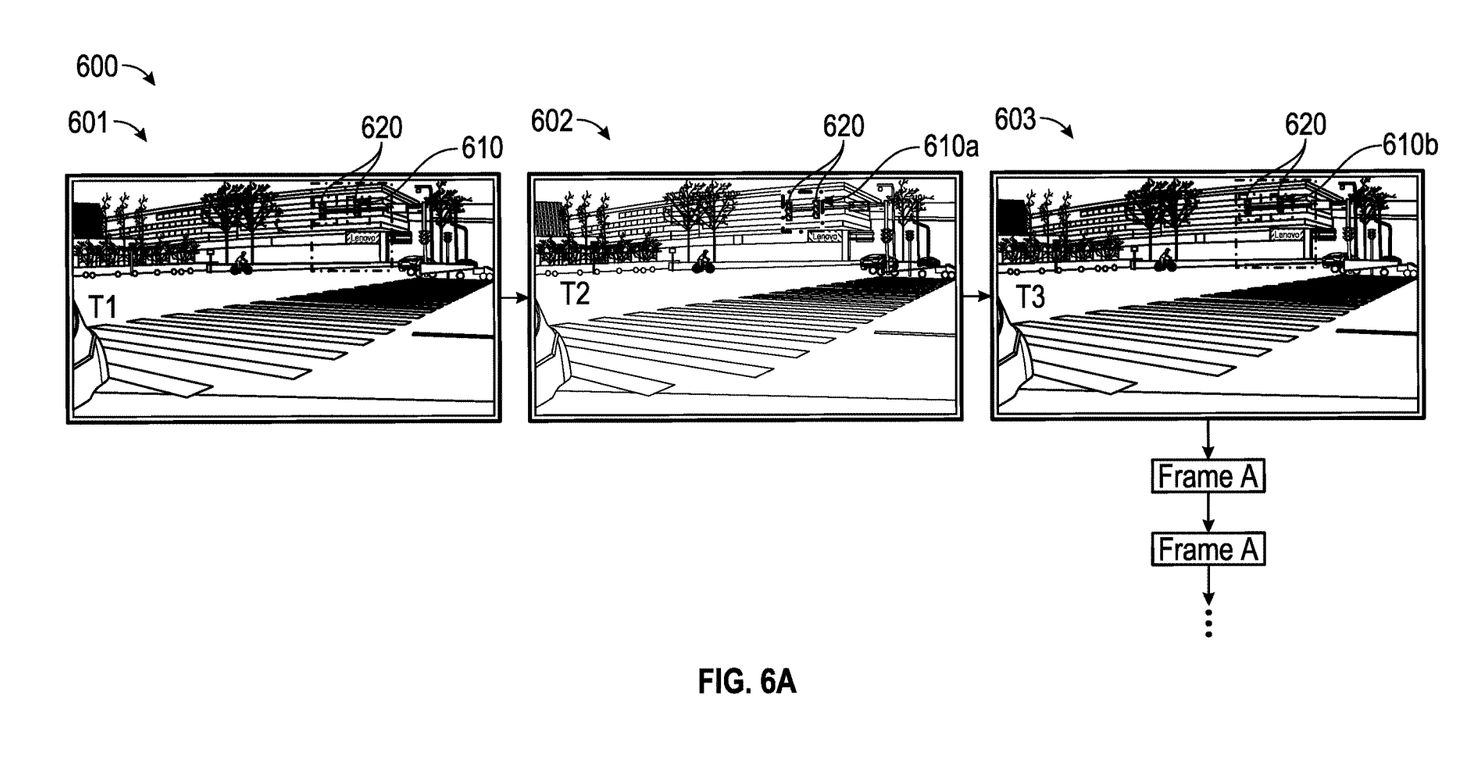
FIGS. 6A-6C illustrate an example of light detection and classification of an autonomous driving system of an autonomous driving vehicle according to one embodiment.
Figure 6B:
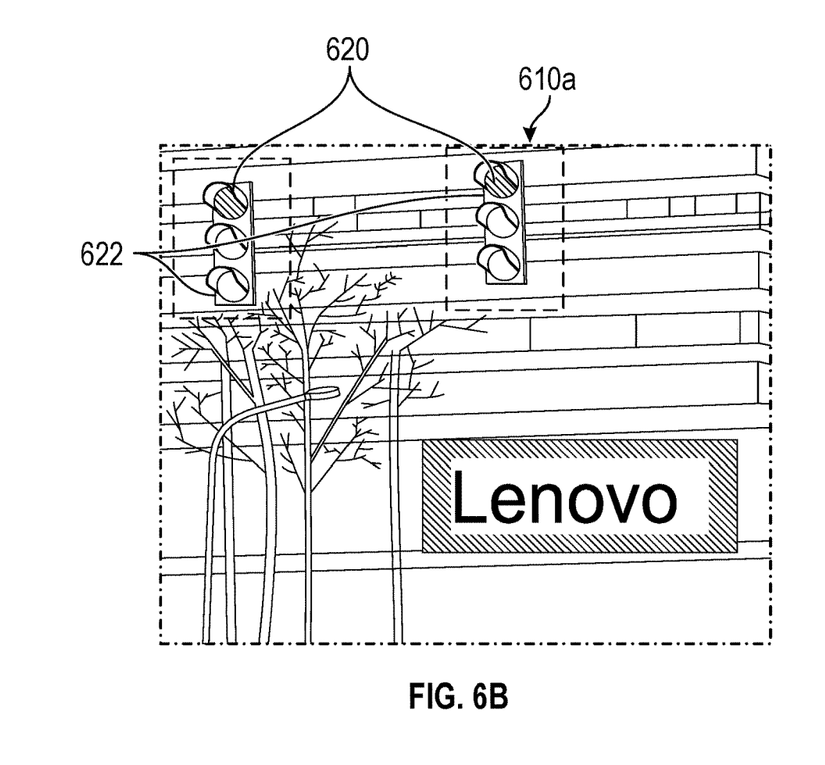
Figure 6C:
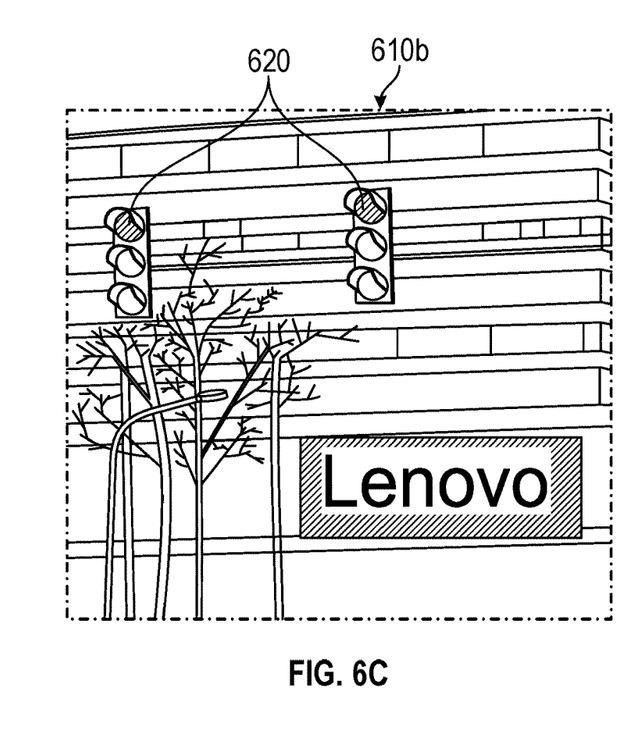

FIGS. 6A-6C illustrate an example 600 of light detection and classification of an autonomous driving system of an autonomous driving vehicle according to one embodiment. FIG. 6A illustrate an example of a process of light detection and classification. FIG. 6B illustrates an enlarged view of a portion 610a of Frame A 602 in FIG. 6A. FIG. 6C illustrates an enlarged view of a portion 610b of Frame B 603 in FIG. 6A. Referring to FIGS. 6A-6C, an ADV may perceive a driving environment based on sensor data obtained from a plurality of sensors mounted on the ADV, where the plurality of sensors includes one or more image sensors. Each of the image sensors may have a sensor setting. For example, the sensor setting may include an exposure time, a gain, etc.

At an initial time T1, the ADV may detect one or more traffic lights 620 based on the sensor data obtained from the plurality of sensors including the one or more image sensors. There may be one or more cameras mounted on the ADV, and each of the one or more cameras may include an image sensor. Under dark/cloudy environment, an initial exposure time (e.g., the exposure time at time T1) in an initial sensor setting of the one or more image sensors may be increased to capture the driving environment.

In one embodiment, the initial exposure time in the initial sensor setting of the one or more image sensors may be determined upon detecting the traffic light(s) 620. Whether the initial exposure time of the one or more image sensors exceeds a predetermined threshold may be determined. For example, the predetermined threshold may be determined based on the red-light intensity saturation threshold (e.g., 521 in FIG. 5). When the initial exposure time in the initial setting of the one or more image sensors exceeds the predetermined threshold, the ADV may fail to recognize the red traffic light signal(s) as discussed in connection with FIG. 5. Thus, the exposure time may be reduced to a minimum exposure time or an exposure time similar to the condition under bright sunlight or daylight, in order to correctly recognize the red traffic light signal(s).

At the time T2, a first sensor setting may be applied to the one or more image sensors in a first frame, which is "Frame A" 602. The first sensor setting may include a first exposure time and/or a first gain. For an example, the first exposure time may be a reduced exposure time such as a minimum exposure time or an exposure time similar to the condition under bright sunlight or daylight. For another example, all the gain(s) may be set to 1, or a minimum gain.

As illustrated in FIG. 6B, in the enlarged view of the portion 610a of "Frame A" 602, the red traffic light(s) 620 may reveal a red color, for example, due to the reduced exposure time and/or reduced gain(s). The determination module 404 in perception module 302 may determine the color of the traffic light(s) 620 as red, thus the red traffic light(s) 620 may be recognized. However, it is difficult to recognize other driving environments, such as lane configuration, obstacles, etc., in the first frame "Frame A" 602.

At the time T3, a second sensor setting may be applied to the one or more image sensors in a second frame, which is "Frame B" 603. The second sensor setting may include a second exposure time and/or a second gain. The second sensor setting may be a normal sensor setting under dark/cloudy environments. For an example, the second exposure time may be an increased exposure time than an exposure time under bright sunlight or daylight. For another example, all the gain(s) may be set to be larger than 1× or a minimum gain.

As illustrated in FIG. 6C, in the enlarged view of the portion 610b of "Frame B" 603, the red traffic light(s) 620 may reveal an orange or yellow color, for example, due to the increased exposure time as discussed in connection with FIG. 5. However, perception module 302 may perceive a driving environment based on sensor data of the one or more sensors in the second frame "Frame B" 603. The ADV may recognize other driving environments, such as lane configuration, obstacles in the second frame "Frame B" 603.

The control module 306 of the ADV may apply the first sensor setting and the second sensor setting to alternate frames. In one embodiment, the ADV may apply the first sensor setting to the one or more sensors to capture the first frame, and apply the second sensor setting to the one or more sensors to capture the second frame, and repeat.

In one embodiment, a bounding box 622 around the traffic light 620 in the sensor data of the one or more sensors in the first frame "Frame A" 602 may be determined. Each traffic light 620 may have one corresponding bounding box 622. A feature of pixels within the bounding box 622 may be extracted. For example, the feature of the pixels within the bounding box 622 may include a mean value, a minimum value, a maximum value, or a percentile of one of red color light (R component), green color light (G component), or blue color light (B component) of the pixels within the bounding box 622. As an example, the feature may be a mean value of red color light (R component).

In one embodiment, the first sensor setting may be determined based on a predetermined threshold of the feature of the pixels within the bounding box. For example, the first exposure time may be set to meet a predetermined threshold of the mean value, the minimum value, the maximum value, or the percentile of one of red color light (R component), green color light (G component), or blue color light (B component) of the pixels within the bounding box 622. As an example, the first exposure time may be set to meet a predetermined threshold of the mean value of red color light (R component) of the pixels within the bounding box 622 in the first frame "Frame A" 602. As another example, the first exposure time may be set to meet a predetermined threshold of the maximum value of red color light (R component) of the pixels within the bounding box 622 in the first frame "Frame A" 602.

The ADV may apply the first sensor setting and the second sensor setting alternatively. The ADV may apply the first sensor setting to capture multiple first frames, or apply the second sensor setting to capture multiple second frames, depending on the light condition and/or environment. In one embodiment, the ADV may apply the first sensor setting to the one or more image sensors to capture multiple first frames, and apply the second sensor setting to the one or more image sensors to capture the second frame. In one embodiment, the ADV may apply the first sensor setting to the one or more image sensors to capture the first frame, and apply the second sensor setting to the one or more image sensors to capture multiple second frames. In one embodiment, the ADV may apply the first sensor setting to the one or more image sensors to capture multiple first frames, and apply the second sensor setting to the one or more image sensors to capture multiple second frames.

The ADV may be controlled to drive autonomously according to the color of the traffic light determined based on sensor data of the one or more image sensors in the first frame and a driving environment perceived based on sensor data of the one or more image sensors in the second frame. For example, a brake of the ADV may be applied to stop the ADV in response to determining the color is red in the traffic light based on sensor data of the one or more image sensors in the first frame. For example, a wheel of the ADV may be turned to change a trajectory of the ADV in response to an obstacle perceived based on sensor data of the one or more image sensors in the second frame. In this way, the ADV may recognize the red color of the traffic light signal and perceive the driving environment under dark/cloudy environment, thereby increasing the driving safety.

Figure 7:
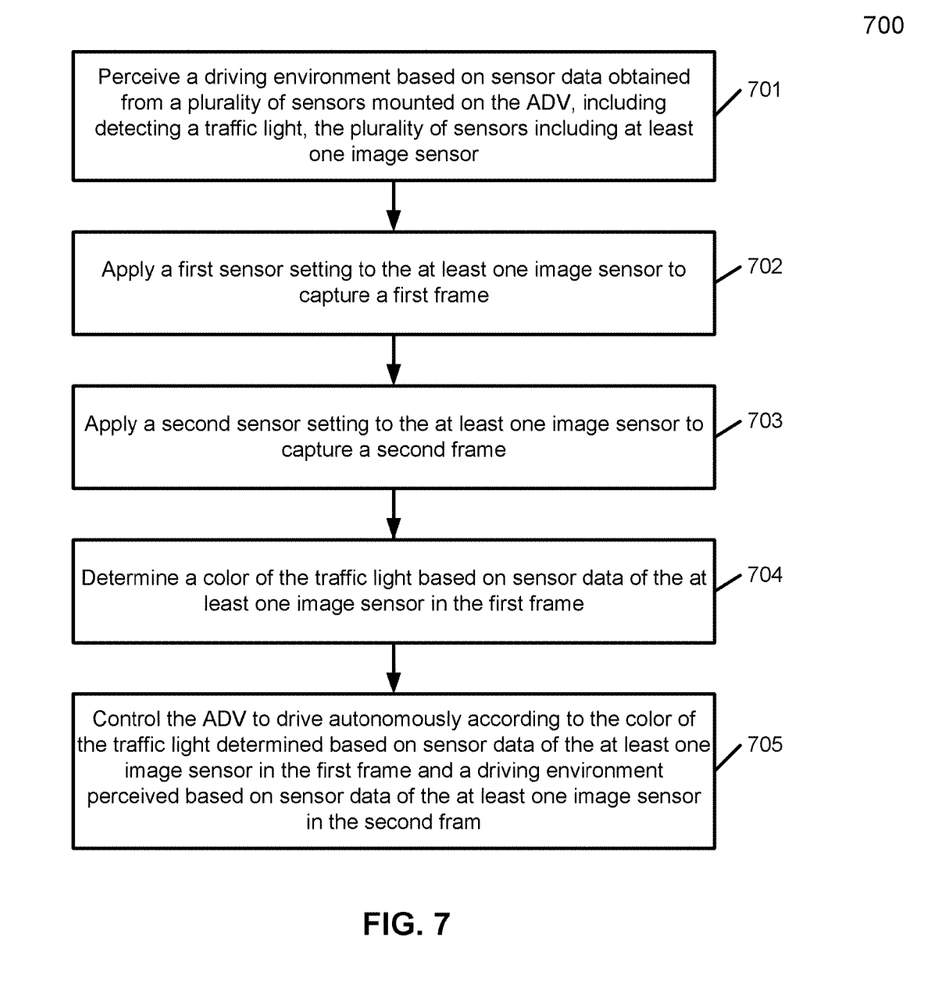
FIG. 7 is a flow chart illustrating an example of a process of light detection and classification of an autonomous driving system of an autonomous driving vehicle according to one embodiment.

FIG. 7 is a flow chart illustrating an example of a process of light detection and classification of an autonomous driving system of an autonomous driving vehicle according to one embodiment. Process 700 may be performed by processing logic which may include software, hardware, or a combination thereof. For example, process 700 may be performed by perception module 302 and/or control module 306. Referring to FIG. 7, in operation 701, processing logic perceives a driving environment surrounding an ADV based on sensor data obtained from a plurality of sensors mounted on the ADV, including detecting a traffic light, in which the plurality of sensors includes at least one image sensor. In operation 702, processing logic applies a first sensor setting to the at least one image sensor to capture a first frame. In operation 703, processing logic applies a second sensor setting to the at least one image sensor to capture a second frame. In operation 704, processing logic determines a color of the traffic light based on sensor data of the at least one image sensor in the first frame. In operation 705, processing logic controls the ADV to drive autonomously according to the color of the traffic light determined based on sensor data of the at least one image sensor in the first frame and a driving environment perceived based on sensor data of the at least one image sensor in the second frame. By this process, the ADV may recognize the red color of the traffic light signal and perceive the driving environment under dark/cloudy environments, thereby increasing the driving safety.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for operating an autonomous driving vehicle (ADV), the method comprising:
   perceiving a driving environment based on sensor data obtained from a plurality of sensors mounted on the ADV, the perceiving including detecting a traffic light, the plurality of sensors including an image sensor;
   applying a first sensor setting to the image sensor to capture a set of first frames, the first sensor setting including at least one of a first exposure time or a first gain;
   alternately applying a second sensor setting to the image sensor to capture a set of second frames, the second sensor setting including at least one of a second exposure time or a second gain, the second sensor setting further including a red light intensity below a red light intensity saturation threshold, wherein at least one of:
the second exposure time is less than the first exposure time, or
the second gain is less than the first gain;
determining a presence of the traffic light based on the set of first frames;
determining a color of the traffic light based on the set of second frames; and
controlling the ADV to drive autonomously according to the determined color of the traffic light and the perceived driving environment.

2. The method of claim 1, wherein at least one of the second exposure time or the second gain is less than the first exposure time or the first gain respectively.

3. The method of claim 1, wherein the first sensor setting is determined based on an initial exposure time exceeding a predetermined threshold.

4. The method of claim 1, further comprising:
determining a bounding box around the traffic light in the set of first frames and the set of second frames; and
extracting a feature of a set of pixels within the bounding box.

5. The method of claim 4, wherein the feature of the set of pixels within the bounding box includes at least one of a mean value, a minimum value, a maximum value, or a percentile of a color, wherein the color comprises at least one of red, green, or blue.

6. The method of claim 4, wherein the first sensor setting is determined based on a predetermined threshold of the feature of the set of pixels within the bounding box.

7. The method of claim 1, further comprising:
determining an initial exposure time in an initial sensor setting of the image sensor upon detecting the traffic light; and
determining whether the initial exposure time of the image sensor exceeds a predetermined threshold;
wherein the first sensor setting is applied to the image sensor in response to determining that the initial exposure time of the image sensor exceeds the predetermined threshold.

8. A non-transitory machine-readable medium having instructions stored therein, which when executed by a processor, cause the processor to perform operations of operating an autonomous driving vehicle (ADV), the operations comprising:
perceiving a driving environment based on sensor data obtained from a plurality of sensors mounted on the ADV, the perceiving including detecting a traffic light, the plurality of sensors including an image sensor;
applying a first sensor setting to the image sensor to capture a set of first frames, the first sensor setting including at least one of a first exposure time or a first gain;
alternately applying a second sensor setting to the image sensor to capture a set of second frames, the second sensor setting including at least one of a second exposure time or a second gain, the second sensor setting further including a red light intensity below a red light intensity saturation threshold, and wherein at least one of:
the second exposure time is less than the first exposure time, or
the second gain is less than the first gain;
determining a presence of the traffic light based on the set of first frames;
determining a color of the traffic light based on the set of second frames; and
controlling the ADV to drive autonomously according to the determined color of the traffic light and the perceived driving environment.

9. The non-transitory machine-readable medium of claim 8, wherein at least one of the second exposure time or the second gain is less than the first exposure time or the first gain respectively.

10. The non-transitory machine-readable medium of claim 8, wherein the first sensor setting is determined based on an initial exposure time exceeding a predetermined threshold.

11. The non-transitory machine-readable medium of claim 8, wherein the operations further comprise:
determining a bounding box around the traffic light in the set of first frames and the set of second frames; and
extracting a feature of a set of pixels within the bounding box.

12. The non-transitory machine-readable medium of claim 11, wherein the feature of the set of pixels within the bounding box includes at least one of a mean value, a minimum value, a maximum value, or a percentile of a color, wherein the color comprises at least one of red, green, or blue.

13. The non-transitory machine-readable medium of claim 11, wherein the first sensor setting is determined based on a predetermined threshold of the feature of the set of pixels within the bounding box.

14. The non-transitory machine-readable medium of claim 8, wherein the operations further comprise:
determining an initial exposure time in an initial sensor setting of the image sensor upon detecting the traffic light; and
determining whether the initial exposure time of the image sensor exceeds a predetermined threshold;
wherein the first sensor setting is applied to the image sensor in response to determining that the initial exposure time of the image sensor exceeds the predetermined threshold.

15. A data processing system, comprising:
a processor; and
a memory coupled to the processor to store instructions, which when executed by the processor, cause the processor to perform operations of operating an autonomous driving vehicle (ADV), the operations including:
perceiving a driving environment based on sensor data obtained from a plurality of sensors mounted on the ADV, the perceiving including detecting a traffic light, the plurality of sensors including an image sensor;
applying a first sensor setting to the image sensor to capture a set of first frames, the first sensor setting including at least one of a first exposure time or a first gain;
alternately applying a second sensor setting to the image sensor to capture a set of second frames, the second sensor setting including at least one of a second exposure time or a second gain, the second sensor setting further including a red light intensity below a red light intensity saturation threshold, wherein at least one of:
the second exposure time is less than the first exposure time, or
the second gain is less than the first gain;
determining a presence of the traffic light based on the set of first frames;

determining a color of the traffic light based on the set of second frames; and controlling the ADV to drive autonomously according to the determined color of the traffic light and the perceived driving environment.

16. The data processing system of claim 15, wherein at least one of the second exposure time or the second gain is less than the first exposure time or the first gain respectively.

17. The data processing system of claim 15, wherein the first sensor setting is determined based on an initial exposure time exceeding a predetermined threshold.

18. The data processing system of claim 15, wherein the operations further comprise:

determining a bounding box around the traffic light in the set of first frames and the set of second frames; and extracting a feature of a set of pixels within the bounding box.

19. The data processing system of claim 18, wherein the feature of the set of pixels within the bounding box includes at least one of a mean value, a minimum value, a maximum value, or a percentile of one of a color, wherein the color comprises at least one of red, green, or blue.

20. The data processing system of claim 18, wherein the first sensor setting is determined based an initial exposure time exceeding a predetermined threshold.

21. The data processing system of claim 15, wherein the operations further comprise:

determining an initial exposure time in an initial sensor setting of the image sensor upon detecting the traffic light; and determining whether the initial exposure time of the image sensor exceeds a predetermined threshold;

wherein the first sensor setting is applied to the image sensor in response to determining that the initial exposure time of the image sensor exceeds the predetermined threshold.

* * * * *